US010177338B2

(12) United States Patent
Hong et al.

(10) Patent No.: US 10,177,338 B2
(45) Date of Patent: Jan. 8, 2019

(54) GLASS POWDER BLEND, GLASS POWDER PASTE AND PHOTOELECTRIC PACKAGE

(71) Applicant: BOE TECHNOLOGY GROUP CO., LTD., Beijing (CN)

(72) Inventors: Rui Hong, Beijing (CN); Dan Wang, Beijing (CN); Seiji Fujino, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 36 days.

(21) Appl. No.: 14/761,866

(22) PCT Filed: Oct. 30, 2014

(86) PCT No.: PCT/CN2014/089892
§ 371 (c)(1),
(2) Date: Jul. 17, 2015

(87) PCT Pub. No.: WO2015/149510
PCT Pub. Date: Oct. 8, 2015

(65) Prior Publication Data
US 2016/0285037 A1    Sep. 29, 2016

(30) Foreign Application Priority Data

Mar. 31, 2014  (CN) .......................... 2014 1 0127773

(51) Int. Cl.
*H01L 51/00* (2006.01)
*H01L 51/52* (2006.01)
(Continued)

(52) U.S. Cl.
CPC .......... *H01L 51/5237* (2013.01); *C03C 3/142* (2013.01); *C03C 3/21* (2013.01);
(Continued)

(58) Field of Classification Search
CPC ......... C03C 3/062; C03C 3/064; C03C 3/066; C03C 3/07; C03C 3/072; C03C 3/074;
(Continued)

(56) References Cited

U.S. PATENT DOCUMENTS 7,893,613 B2 * 2/2011 Kwak ....................... C03C 8/24
313/506
2007/0176553 A1 * 8/2007 Kwak ....................... C03C 8/24
313/512
(Continued)

FOREIGN PATENT DOCUMENTS

CN           1587147 A      3/2005
CN         101009317 A      8/2007
(Continued)

OTHER PUBLICATIONS

Machine translation of CN102082056, part of Applicant's IDS.*
(Continued)

*Primary Examiner* — Mounir Amer
*Assistant Examiner* — Alexander Belousov
(74) *Attorney, Agent, or Firm* — Nath Goldberg & Meyer; Joshua B. Goldberg; Daniel Bissing

(57) ABSTRACT

The present invention provides a glass powder blend comprising glass powder and additives, wherein the additives comprise copper powder, and the copper powder accounts for 2-3 mass % based on the total amount of the glass powder blend in 100 mass %. The present invention also provides a glass powder paste and a photoelectric package. Due to the addition of copper powder to the glass powder, the melting point of the glass powder blend can be decreased, thereby lowering the temperature for melting the glass powder blend by using laser, and reducing the thermal stress generated during encapsulation.

10 Claims, 1 Drawing Sheet

(51) Int. Cl.
  *C03C 3/21*    (2006.01)
  *C03C 8/10*    (2006.01)
  *C03C 8/18*    (2006.01)
  *C03C 12/00*   (2006.01)
  *C03C 8/08*    (2006.01)
  *C03C 3/14*    (2006.01)
  *C03C 8/16*    (2006.01)
  *C09D 17/00*   (2006.01)
  *C08K 3/40*    (2006.01)
  *C09D 1/00*    (2006.01)
  *C09D 5/34*    (2006.01)
  *C09D 7/61*    (2018.01)
  *C08K 3/08*    (2006.01)

(52) U.S. Cl.
  CPC ............. *C03C 8/08* (2013.01); *C03C 8/10* (2013.01); *C03C 8/16* (2013.01); *C03C 8/18* (2013.01); *C03C 12/00* (2013.01); *C08K 3/40* (2013.01); *C09D 1/00* (2013.01); *C09D 5/34* (2013.01); *C09D 7/61* (2018.01); *C09D 17/002* (2013.01); *C09D 17/006* (2013.01); *H01L 51/5246* (2013.01); *C08K 2003/085* (2013.01)

(58) Field of Classification Search
  CPC ......... C03C 3/076; C03C 3/078; C03C 3/083; C03C 3/085; C03C 3/089; C03C 3/091; C03C 3/093; C03C 3/097; C03C 3/102; C03C 3/105; C03C 3/108; C03C 8/24; H01J 9/261; H01L 31/0481
  See application file for complete search history.

(56) References Cited

U.S. PATENT DOCUMENTS

2009/0247385 A1    10/2009   Ide
2016/0122231 A1*   5/2016    Ishihara ............... C03C 8/14
                                                 257/100

FOREIGN PATENT DOCUMENTS

| CN | 101186433 A | 5/2008 |
| CN | 101503277 A | 8/2009 |
| CN | 101684033 A | 3/2010 |
| CN | 101760144 A | 6/2010 |
| CN | 102082056 A | 6/2011 |
| CN | 103492334 A | 1/2014 |
| CN | 103936287 A | 7/2014 |

OTHER PUBLICATIONS

2nd office action issued in Chinese application No. 201410127773.6 dated Feb. 15, 2016.
ISR issued in international application No. PCT/CN2014/089892 dated Feb. 6, 2015.
1st office action issued in Chinese application No. 201410127773.6 dated Sep. 1, 2015.

* cited by examiner

US 10,177,338 B2

GLASS POWDER BLEND, GLASS POWDER PASTE AND PHOTOELECTRIC PACKAGE

This is a National Phase Application filed under 35 U.S.C. 371 as a national stage of PCT/CN2014/089892 filed on Oct. 30, 2014, an application claiming the benefit to Chinese application No. 201410127773.6 filed on Mar. 31, 2014; the content of each of which is hereby incorporated by reference in its entirety.

TECHNICAL FIELD

The present invention relates to the technical filed of packaging photoelectric elements, particularly to a glass powder blend, a glass powder paste prepared by the glass powder blend, and a photoelectric package encapsulated by using the glass powder paste.

BACKGROUND

Many photoelectric elements are required to be encapsulated in use, so as to prevent their contact with ambient water vapor and oxygen.

At present, as a common encapsulation method, the photoelectric element is encapsulated by melting glass powder with laser to obtain a photoelectric package.

A photoelectric package comprises a first substrate, a second substrate and a photoelectric element set between the first substrate and the second substrate. During the encapsulation, the glass powder paste is disposed around the edges of the first substrate or the second substrate, and then is molten by laser so as to connect the first substrate to the second substrate fixedly.

In the course of the entire encapsulation, the temperature rises from a low temperature to a high temperature, and then drops to a low temperature again. The first and second substrates are generally high-temperature resistant glass substrates, which have an expansion coefficient of about $34.5 \times 10^{-7}/°$ C., whereas the commercially available glass powder typically has an expansion coefficient of $70 \times 10^{-7}/°$ C. to $80 \times 10^{-7}/°$ C. The difference therebetween is so large that stress is often produced during the change of the temperature. If the stress is not fully released in the fabrication process, it will result in distortion and damage to the glass sealing material.

Therefore, how to reduce the stress generated in the encapsulation process of photoelectric elements has become a technical problem urgently need to be addressed in the art.

SUMMARY

An object of the present invention is to provide a glass powder blend so that the stress generated is relatively small when a paste comprising the glass powder blend is used during the encapsulation of a photoelectric package.

To achieve the above object, in one aspect, the present invention provides a glass powder blend comprising glass powder and additives, wherein the additives comprise copper powder, and the copper powder accounts for 2-3 mass % based on the total amount of the glass powder blend in 100 mass %.

Preferably, the additives further comprise $TeO_2$ powder which accounts for 3-6 mass % based on the total amount of the glass powder blend in 100 mass %.

Preferably, the glass powder comprises $V_2O_5$ powder and $P_2O_5$ powder, wherein, based on the total amount of the glass powder blend in 100 mass %, the $V_2O_5$ powder accounts for 40-60 mass %, and the $P_2O_5$ powder accounts for 18-36 mass %.

Preferably, the glass powder comprises PbO powder, $B_2O_3$ powder and ZnO powder, wherein, based on the total amount of the glass powder blend in 100 mass %, the PbO powder accounts for 45-60 mass %, the $B_2O_3$ powder accounts for 20-40 mass %, and the ZnO powder accounts for 10-15 mass %.

Preferably, the additives further comprise ceramic powder.

Preferably, each of the above-mentioned components in the glass powder blend has an average particle diameter between 0.3 μm and 4 μm.

Preferably, the copper powder has an average particle diameter between 1.0 μm and 2.5 μm.

Another object of the present invention is to provide a glass powder paste which has a similar expansion coefficient to that of the substrate used for encapsulation, therefore a relatively small stress may be generated when a photoelectric element is encapsulated by melting the glass powder paste with laser.

This object is achieved by providing a glass powder paste comprising the above-mentioned glass powder blend according to the present invention, and a solvent for glass powder, wherein the glass powder blend accounts for 25-75 mass % based on the total amount of the glass powder paste in 100 mass %, with balance of the solvent for glass powder.

Preferably, the solvent for glass powder includes (based on the total amount of the solvent for glass powder in 100 mass %):
  40-53 mass % of ethyl cellulose;
  19-26 mass % of isopropanol;
  12-15 mass % of resin;
  5-10 mass % of terebinthina; and
  4-10 mass % of ethanol.

Another object of the present invention is to provide a photoelectric package encapsulated by using the above glass powder paste. Since the glass powder paste only produces a relatively small stress in the encapsulation, encapsulation failure will not occur due to excessive stress.

This object is achieved by providing a photoelectric package which includes a first substrate, a second substrate, a photoelectric element disposed between the first substrate and the second substrate and an encapsulating material surrounding the photoelectric element, wherein the encapsulating material connects the first substrate to the second substrate fixedly, and the encapsulating material is formed by melting the above glass powder paste of the present invention with laser and then curing.

Due to the addition of copper powder to the glass powder, the melting point of the glass powder blend can be decreased, thereby lowering the temperature for melting the glass powder blend by using laser, and reducing the thermal stress generated during encapsulation.

DETAILED DESCRIPTION OF CERTAIN EMBODIMENTS

Figure 1:
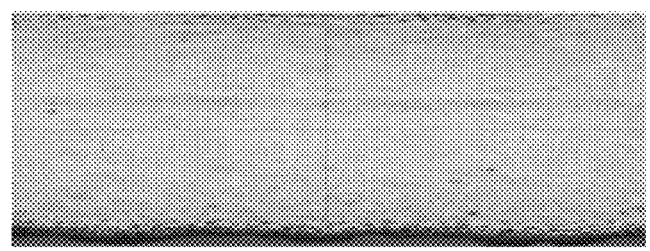
FIG. 1 shows the photograph of the glass powder paste after sintering according to an example of the present invention.

Hereinafter, specific embodiments of the present invention will be described in detail. It should be understood that the specific embodiments described herein are only intended to illustrate and explain the present invention, but not to limit the invention.

In one aspect, the present invention provides a glass powder blend comprising glass powder and additives, wherein the additives comprise copper powder, and the copper powder accounts for 2-3 mass % based on the total amount of the glass powder blend in 100 mass %.

Due to the addition of copper powder to the glass powder, the melting point of the glass powder blend can be decreased, thereby lowering the temperature difference for melting the glass powder blend by using laser, and reducing the thermal stress generated during encapsulation.

Controlling the mass percentage of copper powder in the range of 2-3% can not only reduce the melting temperature of the glass powder blend efficiently, but also make the glass powder paste prepared by the glass powder blend have a suitable viscosity.

In the present invention, specific components of the glass powder are not particularly limited. For example, the glass powder may be any commercially available glass powder.

As an embodiment of the present invention, the glass powder comprises $V_2O_5$ powder and $P_2O_5$ powder, wherein, based on the total amount of the glass powder blend in 100 mass %, the $V_2O_5$ powder accounts for 40-60 mass %, and the $P_2O_5$ powder accounts for 18-36 mass %. Preferably, the glass powder may further comprise one or more trace components selected from ZrO, TiO, $MoO_3$, $SiO_2$, ZnO, $Al_2O_3$ and the like.

Alternatively, as another embodiment of the present invention, the glass powder comprises PbO powder, $B_2O_3$ powder and ZnO powder, wherein, based on the total amount of the glass powder blend in 100 mass %, the PbO powder accounts for 45-60 mass %, the $B_2O_3$ powder accounts for 20-40 mass %, and the ZnO powder accounts for 10-15 mass %. Similarly, in this embodiment, the glass powder may further comprise one or more trace components selected from ZrO, TiO, $MoO_3$, $SiO_2$, $Al_2O_3$ and the like.

Herein, the term "trace component(s)" means that the amount of the component(s) is(are) no more than 1.5% of the total mass of the glass powder, preferably no more than 1%, more preferably no more than 0.5%. Usually, the total amount of the trace components is no more than 3% of the total mass of the glass powder, preferably no more than 2%, more preferably no more than 1.5%.

Preferably, the additives further comprise $TeO_2$ powder which accounts for 3-6 mass % based on the total amount of the glass powder blend in 100 mass %.

$TeO_2$ powder can improve the absorptivity of the glass powder blend to laser having infrared wavelength during its molten by laser, thereby improving the efficiency of encapsulation.

Controlling the mass percent of $TeO_2$ between 3% and 6% involves the following advantages: on one hand, it can prevent the superfusion of the glass powder to avoid the overtemperature during the encapsulation; on the other hand, it will not increase the required power of laser, thereby reducing the power consumption and saving energy.

Preferably, the additives further comprise ceramic powder. Adding ceramic powder can reduce the expansion coefficient of the glass powder blend, thereby further reducing the stress generated in the encapsulation.

Preferably, each of the components in the glass powder blend has an average particle diameter between 0.3 µm and 4 µm. Controlling each of the components of the blend in above range can not only reduce the expansion coefficient and melting temperature of the glass powder blend efficiently, but also make them disperse evenly in the solvent of the glass powder paste which will be described below. Preferably, the copper powder has a particle diameter between 1.0 µm and 2.5 µm.

In another aspect, the present invention provides a glass powder paste comprising the above-mentioned glass powder blend according to the present invention, and a solvent for glass powder, wherein the glass powder blend accounts for 25-75 mass % based on the total amount of the glass powder paste in 100 mass %, with balance of the solvent for glass powder.

During the encapsulation process, the glass powder blend is made into glass powder paste which is handily coated between the substrates and the amount of which to be coated on the substrate is also easily controlled.

As described above, the glass powder blend has a relatively low melting point and a similar expansion coefficient to that of the substrate, therefore the produced stress is small accordingly when the glass powder paste is used in the encapsulation.

As a specific embodiment of the present invention, the solvent for glass powder may include (based on the total amount of the solvent for glass powder in 100 mass %):
40-53 mass % of ethyl cellulose;
23-26 mass % of isopropanol;
12-15 mass % of resin;
5-10 mass % of terebinthina; and
4-10 mass % of ethanol.

The resin may be epoxy resin or acrylic resin. The terebinthina includes but not limited to terpinyl formate, terpinyl acetate and α-terpinyl propionate.

In yet another aspect, the present invention provides a photoelectric package which includes a first substrate, a second substrate, a photoelectric element disposed between the first substrate and the second substrate and an encapsulating material surrounding the photoelectric element, wherein the encapsulating material connects the first substrate to the second substrate fixedly, and the encapsulating material is formed by melting the above glass powder paste of the present invention with laser and then curing. The technology of melting-and-curing glass powder paste by laser is well-known in the art, which need not to be repeated here.

Usually, the photoelectric element is an organic light emitting diode (OLED). Due to the small stress in the encapsulation, the display device has a high flatness when such photoelectric package is used in a display device.

EXAMPLES

Hereinafter, the expansion coefficient was measured by a thermal dilatometer wi63479 (available from Winsinstrument (Beijing) Technology Co., Ltd.); the particle diameter was measured by a Malvern laser particle size analyzer Mastersizer 2000 (available from Malvern Instruments Ltd.); the glass transition temperature and the melting temperature were measured by a thermo gravimetric analyzer Q50001R TGA (available from TA Instruments Ltd.); and the viscosity was measured by a viscometer RVF-100 (available from Brookfield Company) at 25° C. and 10 rpm of rotational speed with a rotor having a diameter of 8.71 mm. Unless otherwise specified, the raw materials of the glass powder were purchased from Beijing Asahi Electronic Materials Co., Ltd.; the ceramic powder was purchased from West Japan Trade Corporation; and the glass powder solvents were purchased from Beijing Chemical Reagent Works. The term D(n)=X μm means that n×100% of the powder in the glass powder blend has a particle diameter of X μm or less.

Example 1

48 g of $V_2O_5$ powder, 25 g of $P_2O_5$ powder, 6 g of $TeO_2$ powder, 3 g of copper powder, and 27 g of ceramic powder CP-0076 were mixed evenly to obtain 110 g glass powder blend, wherein the results measured by Malvern laser particle size analyzer show that, in the glass powder blend, D(0.1)=0.63 μm, D(0.5)=1.56 μm, D(0.9)=2.97 μm, and the copper powder has an average particle diameter of 1.5 μm.

100 g of the resulted glass powder blend was added to 300 g of glass powder solvent so as to obtain a glass powder paste. The components of the glass powder solvent are as follows: 160 g of ethyl cellulose, 65 g of isopropanol, 45 g of Topic-s resin (available from Nissan Chemical Co. Ltd.), 30 g of dihydroterpinyl acetate (available from Sekisui Chemical Co., Ltd.), and 30 g of ethanol.

The resulted glass powder paste has a glass transition temperature Tg of 302° C., an initial melting temperature Ts of 335° C., a final melting temperature of 405° C., an expansion coefficient of $46 \times 10^{-7}/°$ C., and a viscosity of 126 Pa·S.

Substrates used for OLED are Lotus XT high-temperature glasses available from Corning Glass Company and they have an expansion coefficient of $34.5 \times 10^{-7}/°$ C. which is similar to the expansion coefficient of the glass powder blend provided in this example.

Example 2

60 g of $V_2O_5$ powder, 18 g of $P_2O_5$ powder, 3 g of $TeO_2$ powder, 2 g of copper powder, and 17 g of ceramic powder were mixed evenly to obtain 100 g glass powder blend, wherein the results measured by Malvern laser particle size analyzer show that, in the glass powder blend, D(0.1)=0.63 μm, D(0.5)=1.56 μm, D(0.9)=2.97 μm, and the copper powder has an average particle diameter of 1.5 μm. The ceramic powder is CP-0076 purchased from West Japan Trade Corporation.

100 g of the resulted glass powder blend was added to 100 g of glass powder solvent so as to obtain a glass powder paste. The components of the glass powder solvent are as follows: 53 g of ethyl cellulose, 23 g of isopropanol, 15 g of Topic-s resin, 5 g of dihydroterpinyl acetate, and 4 g of ethanol.

The resulted glass powder paste has a glass transition temperature Tg of 316° C., an initial melting temperature Ts of 405° C., a final melting temperature of 450° C., an expansion coefficient of $46.7 \times 10^{-7}/°$ C., and a viscosity of 114 Pa·S.

Substrates used for OLED are Lotus XT high-temperature glasses available from Corning Glass Company, and they have an expansion coefficient of $34.5 \times 10^{-7}/°$ C. which is similar to the expansion coefficient of the glass powder blend provided in this example.

Example 3

46 g of PbO powder, 22 g of $B_2O_3$ powder, 13 g of ZnO powder, 3 g of copper powder, 13 g of ceramic powder, 2 g of $TeO_2$ powder and the balance of trace components were mixed evenly to obtain 100 g glass powder blend, wherein the results measured by Malvern laser particle size analyzer show that, in the glass powder blend, D(0.1)=0.53 μm, D(0.5)=1.56 μm, D(0.9)=3.57 μm, and the copper powder has an average particle diameter of 1.5 μm.

100 g of the resulted glass powder blend was added to 285 g of glass powder solvent so as to obtain a glass powder paste. The components of the glass powder solvent are as follows: 139 g of ethyl cellulose, 65 g of isopropanol, 42 g of Topic-s resin, 26 g of dihydroterpinyl acetate, and 13 g of ethanol.

The resulted glass powder paste has a glass transition temperature Tg of 297° C., an initial melting temperature Ts of 324° C., a final melting temperature of 397° C., an expansion coefficient of $49 \times 10^{-7}/°$ C., and a viscosity of 137 Pa·S.

Substrates used for OLED are Lotus XT high-temperature glass available from Corning Glass Company, and they have an expansion coefficient of $34.5 \times 10^{-7}/°$ C. which is similar to the expansion coefficient of the glass powder blend provided in this example.

Example 4

65 g of PbO powder, 20 g of $B_2O_3$ powder, 5 g of ZnO powder, 3 g of copper powder, 6.2 g of ceramic powder and the balance of trace components were mixed evenly to obtain 100 g glass powder blend, wherein the results measured by Malvern laser particle size analyzer show that, in the glass powder blend, D(0.1)=0.53 μm, D(0.5)=1.56 μm, D(0.9)=3.57 μm, and the copper powder has an average particle diameter of 1.5 μm.

100 g of the resulted glass powder blend was added to 285 g of glass powder solvent so as to obtain a glass powder paste. The components of the glass powder solvent are as follows: 146 g of ethyl cellulose, 65 g of isopropanol, 34 g of Topic-s resin, 26 g of dihydroterpinyl acetate, and 14 g of ethanol.

The resulted glass powder paste has a glass transition temperature Tg of 318° C., an initial melting temperature Ts of 364° C., a final melting temperature of 425° C., an expansion coefficient of $34 \times 10^{-7}/°$ C., and a viscosity of 98 Pa·S.

Performance Test and Comparison

Figure 2:
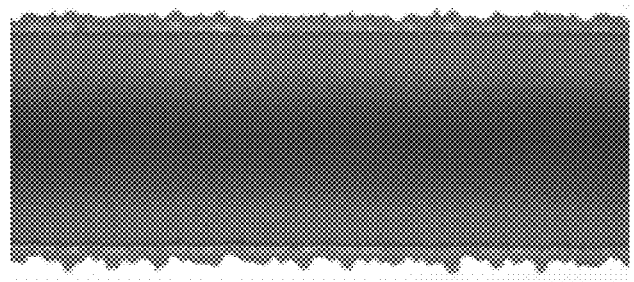
FIG. 2 shows the photograph of the glass powder paste after irradiation by laser according to an example of the present invention.
Figure 3:
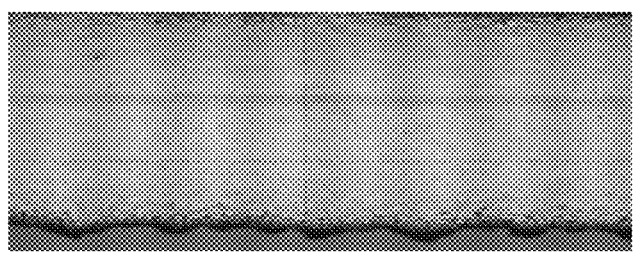
FIG. 3 shows the photograph of the glass powder paste as a comparative sample after sintering.
Figure 4:
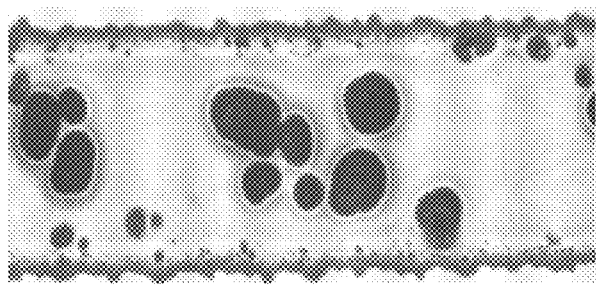
FIG. 4 shows the photograph of the glass powder paste as a comparative sample after irradiation by laser.

The glass powder paste obtained in Example 2 was used as Sample 1, and a commercially available product DP-02 (available from Continents Electronic Materials Co., Ltd., Korea) was used as Sample 2. The viscosity values of samples 1 and 2 were measured respectively, and the characters of each sample after being sintered and irradiated with laser were observed by Nikon metallographic microscope (available from Nikon Corporation, magnified 10 times), as shown in FIGS. 1-4. The evaluation results are shown in Table 1 below.

TABLE 1

|  | Sample 1 | Sample 2 |
| --- | --- | --- |
| Viscosity | 80,000 cps | 90,000 cps |
| Sintering temperature | 420° C. | 450° C. |
| Photograph after | smooth and clear | rough and uneven |

TABLE 1-continued

|  | Sample 1 | Sample 2 |
|---|---|---|
| sintering Photograph after irradiation by laser | edges good sealing and no crack | edges bad sealing and slight cracks |

It can be seen from the table that, the sintering temperature of Sample 1 containing fine copper powder is lower than that of Sample 2 without fine copper powder; and after being sintered, the edges of Sample 1 are smooth and clear whereas the edges of Sample 2 are rough and uneven. Moreover, Sample 1 after being irradiated by laser can achieve good sealing and has no crack defect, whereas Sample 2 exists slight cracks and results in bad sealing.

It can be understood that, the foregoing description of the embodiments has been provided for the purpose of illustrating the principles of the present invention; however the present invention is not limited to this. Obviously, many modifications and variations will be apparent to a person skilled in the art without departing from the spirit and essence of the present invention, and these modifications and variations also fall into the scope of the invention.

The invention claimed is:

1. A glass powder blend consisting of glass powder and additives, wherein the additives are composed of copper powder, $TeO_2$ powder, and ceramic powder, and the copper powder accounts for 2-3 mass % based on the total amount of the glass powder blend in 100 mass % and the copper powder has an average particle diameter between 1.0 µm and 2.5 µm.

2. The glass powder blend according to claim 1, wherein the TeO2 powder accounts for 3-6 mass % based on the total amount of the glass powder blend in 100 mass %.

3. The glass powder blend according to claim 1, wherein the glass powder comprises V2O5 powder and P2O5 powder, wherein, based on the total amount of the glass powder blend in 100 mass %, the V2O5 powder accounts for 40-60 mass %, and the P2O5 powder accounts for 18-36 mass %.

4. The glass powder blend according to claim 1, wherein the glass powder comprises PbO powder, B2O3 powder and ZnO powder, wherein, based on the total amount of the glass powder blend in 100 mass %, the PbO powder accounts for 45-60 mass %, the B2O3 powder accounts for 20-40 mass %, and the ZnO powder accounts for 10-15 mass %.

5. The glass powder blend according to claim 1, wherein each of the components in the glass powder blend has an average particle diameter between 0.3 µm and 4 µm.

6. A glass powder paste characterized by comprising the glass powder blend according to claim 1 and a solvent for glass powder,
wherein the glass powder blend accounts for 25-75 mass % of the glass powder paste, with balance of the solvent for glass powder.

7. The glass powder paste according to claim 6, wherein the solvent for glass powder comprises: based on the total amount of the solvent for glass powder in 100 mass %,
40-53 mass % of ethyl cellulose;
19-26 mass % of isopropanol;
12-15 mass % of resin;
5-10 mass % of terebinthina; and
4-10 mass % of ethanol.

8. The glass powder paste according to claim 7, wherein the resin is epoxy resin or acrylic resin.

9. The glass powder paste according to claim 7, wherein the terebinthina includes but not limited to terpinyl formate, terpinyl acetate and α-terpinyl propionate.

10. A photoelectric package, including a first substrate, a second substrate, a photoelectric element disposed between the first substrate and the second substrate and an encapsulating material surrounding the photoelectric element, wherein the encapsulating material connects the first substrate to the second substrate fixedly, the photoelectric package is characterized in that the encapsulating material is formed by curing the glass powder paste according to claim 6 and a solvent for glass powder with a laser.

* * * * *